Oct. 11, 1966 G. A. LONG ETAL 3,278,903

RANDOM FREQUENCY CONTROLLED MONITOR CIRCUIT FOR SECURITY DEVICE

Filed July 10, 1962 2 Sheets-Sheet 1

INVENTORS
GEORGE A. LONG &
RICHARD NELSON

BY Wade Koontz and Sherman H. Goldman
ATTORNEYS

INVENTORS.
GEORGE A. LONG &
RICHARD NELSON
BY
Wade Koontz and
Sherman H. Goldman
ATTORNEYS United States Patent Office 3,278,903
Patented Oct. 11, 1966

3,278,903

RANDOM FREQUENCY CONTROLLED MONITOR CIRCUIT FOR SECURITY DEVICE

George A. Long and Richard Nelson, Rome, N.Y., assignors to the United States of America as represented by the Secretary of the Air Force Filed July 10, 1962, Ser. No. 208,972
3 Claims. (Cl. 340—149)

The invention described herein may be manufactured and used by or for the United States Government for governmental purposes without payment to us of any royalty thereon.

This invention relates to security devices and, more particularly, to a system which protects the line connecting a security device with its remote monitor.

Basically, the system comprises a random frequency generator which pulses a binary relay combination in synchronization which can select equal voltages at each station. A comparator is located at the monitoring station and remains inactive as long as voltages selected are equal. In addition, the system is arranged to fail safe since any malfunction in the equipment causes an alarm.

Accordingly, it is an object of this invention to provide a novel system which acts as a random security line supervisor.

It is another object of this invention to provide a random security line supervisor which utilizes a completely random, nonrepetitive selector the output of which is not capable of duplication even if the components and arrangement of the system are known.

It is still another object of this invention to provide a random security line supervisor which upon failure of a component will register an alarm.

It is a further object of this invention to provide a random security line supervisor which utilizes standard conventional, currently available components which lend themselves to standard mass production manufacturing techniques.

Figure 1:
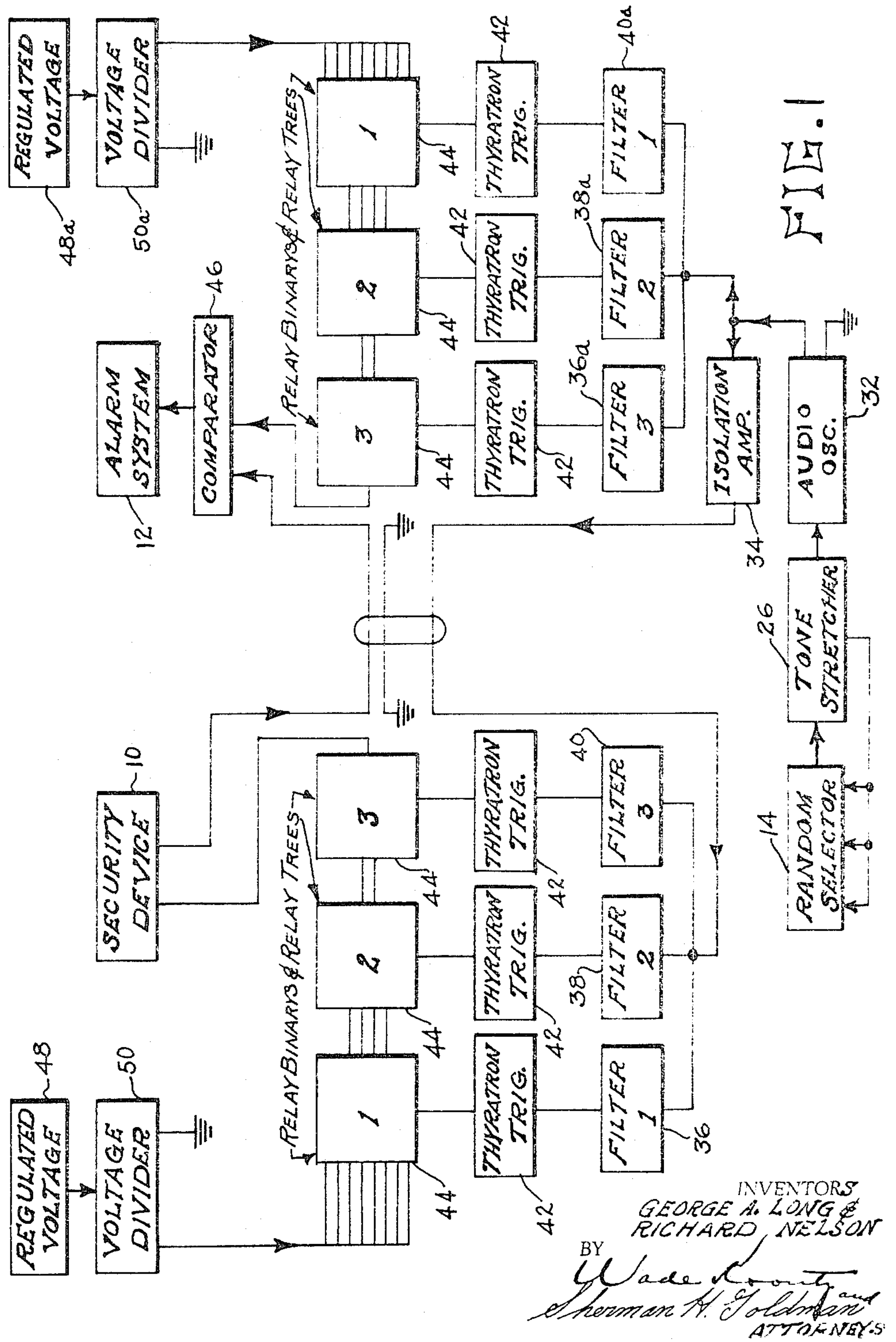
Figure 2:
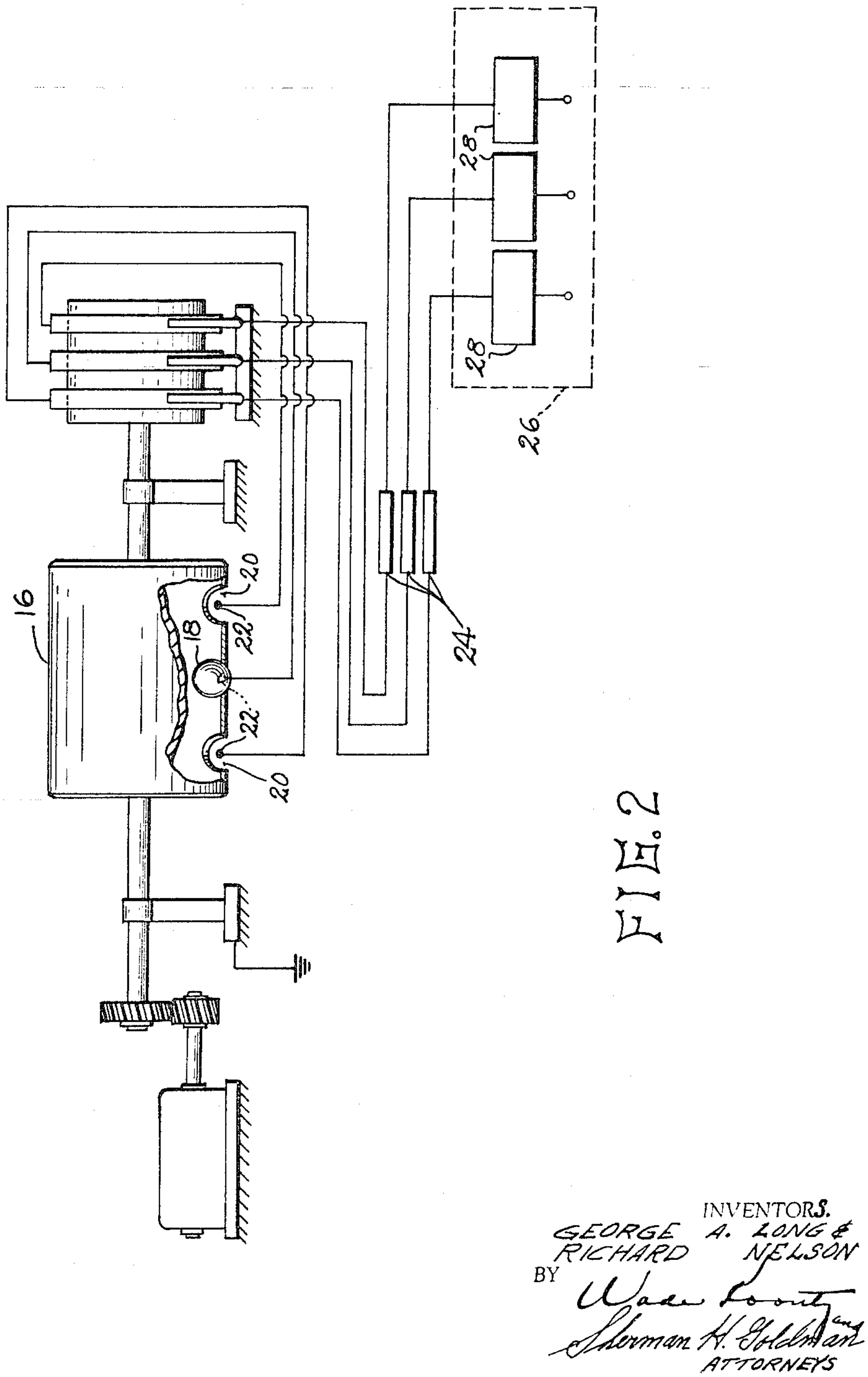

These and other advantages, features and objects of the invention will become more apparent from the following description taken in connection with the illustrative embodiments in the accompanying drawings, wherein:

FIG. 1 comprises a block diagram of the random security line supervisor system; and FIG. 2 is a schematic representation of a random selector.

In FIG. 1 the security device 10 is connected to an alarm system 12 in order to provide protection for a building or apparatus which is to be maintained under a security system. The security device 10 is connected to the alarm system such that any violation of the security of the building or apparatus actuates the alarm, thereby indicating a violation of the security. Usually, devices of this nature, once they are known to adverse parties, may be defeated; however, in the arrangement of this invention a random selector 14 is utilized which renders the system defeat proof in view of the non-repetitive nature of the selector.

The random selector shown in FIG. 2 and at 14 in FIG. 1 may be of several forms; however, the preferred form of the device comprises a small revolving drum 16 containing a small steel ball 18 therein and having at least one row of holes 20 slightly smaller in diameter than the ball 18 to allow the ball to fall part way through as the drum 16 is revolved. Revolution of the drum 16 allows the ball to drop into different holes in a completely random fashion where a steel wire 22, centrally located beneath each hole 20, is arranged to close a circuit to cause momentary actuation of a relay 24 to trigger a tone stretcher 26 which may comprise a thyratron timer and switch or relay 28 to switch different resistors into the frequency determining circuit of an RC oscillator 32. There are three relays for controlling the three timers, thereby allowing the audio oscillator 32 to operate at four different frequencies, one for each timer plus a guard frequency.

Each station, that of the security device and that of the alarm system, receives the output from the audio oscillator 32, and an isolation amplifier 34 is placed between the output of the audio oscillator and the remote station. Each station has three paths which the signal from the audio oscillator may take. One path from each system comprises a pair; e.g., filter 36 and **36*a*, filter 38 and 38*a* and filter 40 and 40*a*, comprises three pairs of notch filters wherein one of each pair may be selected at the remote or security device station 10, while the other is at the monitor station 12. Each pair of filters is tuned to one of the oscillator frequencies, thereby utilizing three of the four frequencies of the output of the audio oscillator 32. The fourth or guard frequency does not fall into any of the notch filters rejection points and thus is passed through all of the filters without any attenuation. Connected to each filter are thyratron triggering means 42** which are arranged to receive, on the control grids of the thyratrons, negative voltage output from the notch filters which is rectified in a conventional manner. The thyratron tubes are operated by alternating current and the negative voltage from the notch filters is utilized to prevent ionization of the gases within the tubes.

Assuming that the random selector 14 is not actuating any of its relays 24 by means of the ball 18 within the cage 16, then the oscillator would be operating at the guard frequency which passes through all the notch filters.

The drum and steel ball combination then triggers one of its relays 24 and selects one of the three notch filter frequencies to be the output of the audio oscillator 32, thereby causing a rejection of the signal by a particular notch filter pair. This causes a reduction in the negative voltage applied to the corresponding thyratron grids of the thyratrons in the triggering means 42, thereby allowing for ionization within the thyratron to cause rectification of the A.C. A relay with a relay tree and a binary selector is connected as shown at 44 with each thyratron trigger 42 for its actuation. Each relay is utilized to pulse a binary relay selector, which is a part of a three stage relay tree. Thus, a removal of the channel frequency or a return of the oscillator 32 to guard frequency would return the negative voltage to the thyratron triggers 42 to stop conduction thereof and cause the attached relays to drop out.

A regulated voltage is supplied to a voltage divider to provide eight equal voltages for each station. The voltages are fed to the relay tree such that it can select any one of the eight voltages depending upon the state of the binary selectors. Each binary pair, one for each station, is set such that the voltages selected by the trees would be equal for each pair. The output voltage from the pairs are fed to a comparator 46 in series with the alarm system 12. The comparator contains a sensitive meter relay which is not actuated when the voltages are equal; however, to compensate for delays in the initial voltage changes, a thyratron timer may be provided in the comparator 46 to remove its meter relay from the line for a short period of time in order to provide a check as to whether or not the voltage difference is real. If, after a time long enough to allow voltage equalization, the timer has returned the meter relay to the line and a difference still exists, an alarm system will be actuated; e.g., by means of pulling in a relay in the alarm system. Balance of the system may be actuated by placing a compensating potentiometer (not shown) in the remote line, thereby assuring equalization of the voltages supplied to the comparator.

Thus, it can be seen that an effective, foolproof, nondefeatable security alarm system may be provided since the changing of tones and voltages is completely random and nonrepetitive. In addition, the components utilized with this invention are all conventional and commercially available while the separate circuits are standard.

Although the invention has been described with reference to a particular embodiment, it will be understood to those skilled in the art that the invention is capable of a variety of alternative embodiments within the spirit and scope of the appended claims.

We claim:

1. A security line supervisor comprising means for generating a signal, frequency control means connected with said generating means for controlling the frequency of said generating means, a random frequency selector connected with said frequency control means for controlling the frequency of said signal generating means in a non repetitive manner, a series of pairs of channels, each of said pairs of channels being capable of passing only preselected frequencies, a separate regulated voltage supply for each channel, a separate voltage divider connected with each of said voltage supplies, means under control of said preselected frequencies for connecting each of said pairs of channels with one of said voltage dividers to provide equal voltages from each channel of each pair of channels and means for comparing the voltages from each of the pairs of channels such that a difference in voltages causes a signal alarm to register.

2. A security line supervisor for a security device having an alarm, said device comprising a random frequency selector for selecting one of a series of frequencies, an oscillator to generate a guard frequency signal and signals of said series of frequencies, a pair of identical channels to pass said series of frequencies, separate circuits in each channel corresponding to the number of frequencies in said series of frequencies, filter means in each of said circuits, each of said filter means being capable of passing said guard frequency and one of said series of frequencies, rectifier means in said circuits connecting with said filters to receive the output therefrom to cause rectification thereof, a voltage divider for each channel, a series of relays for each channel, means connected for operation by said rectifier means to cause the rectified outputs to operate said series of relays for selecting a voltage from the voltage divider of its channel, equal voltages being selected by said relays in each channel by the circuits capable of passing the same frequency as selected by said random frequency selector and means for comparing the voltage output from each channel and for sounding said alarm when said selected voltages are unequal.

3. A device as described in claim 2 wherein said random frequency selector comprises a rotating drum with a row of holes therein of a size to permit a ball in said drum to fall part way through one of said holes to close a circuit containing frequency determining means for said oscillator.

No references cited.

NEIL C. READ, *Primary Examiner.*

L. A. HOFFMAN, H. PITTS, *Assistant Examiners.*